United States Patent
Gong et al.

(10) Patent No.: US 10,059,306 B2
(45) Date of Patent: Aug. 28, 2018

(54) DEFROSTER AND A VEHICLE HAVING THE SAME

(71) Applicant: BYD COMPANY LIMITED, Shenzhen, Guangdong (CN)

(72) Inventors: Qing Gong, Guangdong (CN); Xinping Lin, Guangdong (CN); Shuming Zhao, Guangdong (CN); Zhihai Li, Guangdong (CN); Shumin Wang, Guangdong (CN); Changcai Zhang, Guangdong (CN); Maolin Ren, Guangdong (CN); Liuping Tang, Guangdong (CN); Guocong Chen, Guangdong (CN); Xiaofang Li, Guangdong (CN)

(73) Assignee: BYD Company Limited, Shenzhen, Guangdong (CN)

( * ) Notice: Subject to any disclaimer, the term of this patent is extended or adjusted under 35 U.S.C. 154(b) by 0 days.

(21) Appl. No.: 14/887,830

(22) Filed: Oct. 20, 2015

(65) Prior Publication Data
US 2016/0039390 A1 Feb. 11, 2016

Related U.S. Application Data

(63) Continuation of application No. PCT/CN2014/076297, filed on Apr. 25, 2014.

(30) Foreign Application Priority Data

Apr. 28, 2013 (CN) ............................ 2013 1 0154826
Apr. 28, 2013 (CN) ...................... 2013 2 0223604 U
Apr. 28, 2013 (CN) ...................... 2013 2 0226881 U

(51) Int. Cl.
*B60S 1/02* (2006.01)
*B60S 1/54* (2006.01)
(Continued)

(52) U.S. Cl.
CPC .......... *B60S 1/026* (2013.01); *B60H 1/00471* (2013.01); *B60H 1/2225* (2013.01);
(Continued)

(58) Field of Classification Search
USPC .......... 454/69, 143, 85, 93, 121, 127; 62/61, 62/239, 244
See application file for complete search history.

(56) References Cited

U.S. PATENT DOCUMENTS 3,520,283 A * 7/1970 Forstner .................... F01P 1/02
123/41.58
3,807,631 A * 4/1974 Mohr ................. B60H 1/00671
165/103

(Continued)

FOREIGN PATENT DOCUMENTS

| CA | 2701199 A1 | 10/2011 |
| CN | 2883056 Y | 3/2007 |

(Continued)

OTHER PUBLICATIONS

PCT International Search Report and Written Opinion dated Jul. 16, 2014, issued in corresponding International Application No. PCT/CN2014/076297 (13 pages).

*Primary Examiner* — Steven B McAllister
*Assistant Examiner* — Ko-Wei Lin
(74) *Attorney, Agent, or Firm* — Finnegan, Henderson, Farabow, Garrett & Dunner, LLP

(57) ABSTRACT

A defroster and a vehicle are provided. The defroster includes: a housing defining an air outlet; a heating device disposed in the housing; an air blower defining a blowing outlet and disposed in the housing; and an air duct defining a duct inlet and a duct outlet, the air duct being disposed between the blowing outlet and the heating device so that air blown out from the blower outlet enters the air duct via the duct inlet and goes out of the air duct via the duct outlet, then (Continued)

passes through the heating device to exchange heat with the heating device, and is discharged out of the housing via the air outlet, wherein an area of the duct inlet is different from that of the duct outlet.

19 Claims, 13 Drawing Sheets

(51) Int. Cl.
  *B60S 1/00* (2006.01)
  *B60H 1/00* (2006.01)
  *B60H 1/22* (2006.01)
  *F24H 3/04* (2006.01)
  *F24H 9/00* (2006.01)
  *F24H 9/18* (2006.01)
  *H05B 3/04* (2006.01)
  *H05B 3/50* (2006.01)

(52) U.S. Cl.
  CPC .............. *B60S 1/54* (2013.01); *F24H 3/0429* (2013.01); *F24H 9/0063* (2013.01); *F24H 9/0073* (2013.01); *F24H 9/1872* (2013.01); *H05B 3/04* (2013.01); *H05B 3/50* (2013.01); *B60H 2001/2287* (2013.01); *F24H 2250/04* (2013.01); *H05B 2203/02* (2013.01); *H05B 2203/023* (2013.01)

(56) References Cited

U.S. PATENT DOCUMENTS

| | | | | |
|---|---|---|---|---|
| 4,852,638 | A * | 8/1989 | Hildebrand | B60H 1/0005 137/513.5 |
| 5,284,025 | A | 2/1994 | Kajitani et al. | |
| 5,601,142 | A * | 2/1997 | Hildebrand | B60H 1/00035 165/137 |
| 5,642,856 | A | 7/1997 | Samukawa et al. | |
| 5,673,964 | A * | 10/1997 | Roan | B60H 1/00028 296/208 |
| 5,701,752 | A * | 12/1997 | Tsunokawa | B60H 1/00785 165/204 |
| 5,711,368 | A | 1/1998 | Ito et al. | |
| 5,778,691 | A * | 7/1998 | Suzuki | B60H 1/00907 62/160 |
| 5,873,256 | A * | 2/1999 | Denniston | B60H 1/00414 62/244 |
| 5,934,094 | A * | 8/1999 | Itoh | B60H 1/3205 62/160 |
| 6,205,805 | B1 * | 3/2001 | Takahashi | B60H 3/024 62/271 |
| 6,415,856 | B1 * | 7/2002 | Gilles | B60H 1/00028 165/203 |
| 6,530,831 | B1 * | 3/2003 | Colinet | B60H 1/247 454/121 |
| 7,026,584 | B2 * | 4/2006 | Bohlender | B60H 1/2225 219/548 |
| 7,159,651 | B2 * | 1/2007 | Ito | B60H 1/00007 165/202 |
| 8,680,435 | B2 * | 3/2014 | Bohlender | F24H 3/0405 219/202 |
| 2001/0016472 | A1 * | 8/2001 | Herta | B60H 1/00057 454/121 |
| 2002/0154993 | A1 * | 10/2002 | Kamiya | B60H 1/00471 415/204 |
| 2003/0132222 | A1 * | 7/2003 | Bohlender | F24H 3/0405 219/504 |
| 2004/0098995 | A1 * | 5/2004 | Ito | B60H 1/00064 62/186 |
| 2004/0252986 | A1 * | 12/2004 | Ito | B60H 1/2225 392/485 |
| 2005/0028542 | A1 * | 2/2005 | Yoshida | B60H 1/00278 62/186 |
| 2005/0126774 | A1 * | 6/2005 | Yamaguchi | B60H 1/00021 165/204 |
| 2005/0167169 | A1 * | 8/2005 | Gering | B60H 1/00278 237/12.3 B |
| 2006/0046632 | A1 | 3/2006 | Goupil, Jr. et al. | |
| 2006/0242984 | A1 * | 11/2006 | Kang | B60H 1/3233 62/285 |
| 2007/0068927 | A1 * | 3/2007 | Bohlender | F24H 3/0405 219/505 |
| 2008/0032618 | A1 * | 2/2008 | Katoh | B60H 1/00564 454/143 |
| 2008/0173637 | A1 * | 7/2008 | Taguchi | H05B 3/50 219/523 |
| 2010/0282729 | A1 * | 11/2010 | Taguchi | H05B 3/50 219/202 |
| 2011/0068090 | A1 * | 3/2011 | Bohlender | B60H 1/2225 219/202 |
| 2012/0012573 | A1 * | 1/2012 | Clade | B60H 1/2225 219/208 |
| 2012/0057972 | A1 * | 3/2012 | Kim | B60H 1/00507 415/204 |
| 2013/0306622 | A1 * | 11/2013 | Gu | B60H 1/2225 219/534 |
| 2014/0124494 | A1 * | 5/2014 | Wei | H05B 3/24 219/202 |
| 2016/0001628 | A1 * | 1/2016 | Kakizaki | B60H 1/00835 62/157 |

FOREIGN PATENT DOCUMENTS

| CN | 101259823 A | | 9/2008 |
|---|---|---|---|
| CN | 101987612 A | | 3/2011 |
| CN | 102538095 A | | 7/2012 |
| CN | 203268003 U | | 11/2013 |
| GB | 878038 | | 9/1961 |
| JP | S 59-119445 A | | 7/1984 |
| JP | S 62-137215 A | | 6/1987 |
| JP | H 10-82550 A | | 3/1998 |
| JP | 2001-001751 A | | 1/2001 |
| JP | 2005-153700 A | | 6/2005 |
| JP | 2007-125967 A | | 5/2007 |
| JP | 2010-071213 A | | 4/2010 |
| JP | 2010-117110 A | | 5/2010 |
| JP | 2010117110 A | * | 5/2010 |
| KR | 10-2004-0031444 A | | 4/2004 |
| WO | WO 2014/177026 A1 | | 11/2014 |

* cited by examiner

DEFROSTER AND A VEHICLE HAVING THE SAME

CROSS-REFERENCE TO RELATED APPLICATIONS

This application is a continuation of International Application No. PCT/CN2014/076297, filed on Apr. 25, 2014, which claims priority to and benefits of Chinese Patent Application Serial Nos. 201320223604.3, 201320226881.X and 201310154826.9, all filed with the State Intellectual Property Office of China on Apr. 28, 2013. The entire contents of the above-referenced applications are incorporated herein by reference.

FIELD

Embodiments of the present disclosure generally relate to the field of deforesting or defogging of vehicle, particularly to a defroster and a vehicle having the same.

BACKGROUND

The oil-fueled vehicle in the related art employs a heating and air conditioning system which uses waste heat from tail gas or engine cooling circulating water as a heat resource, and the heat exchanging between air from an air blower and the heat resource is occurred in a heat exchanger, and then the air with heat is blown to the inside of the vehicle to defrost, defog and to supply heating.

With application of a pure electric vehicle and a hybrid vehicle, especially of a pure electric vehicle, there is no sufficient waste heat provided when the vehicle is running. In addition, when the vehicle is running in an extremely cold circumstance, i.e. in winter, there is a need to defrost and defog before the vehicle is started.

Currently, the pure electric vehicle may utilize a defroster having a heating device and an air blower to defrost and defog. However, the speed of the air blown from air blower to the heating device is not uniform. Therefore, the heating device may heat non-uniformly, which may reduce the service life of the heating device. Also, due to the non-uniform speed of the air, the temperature of the air after being heated by the heating device may be different, thus causing an un-uniform defrosting effect and an undesired defrosting area.

SUMMARY

Embodiments of the present disclosure seek to solve at least one of the problems existing in the prior art to at least some extent, or to provide a consumer with a useful alternative.

Embodiments of a first broad aspect of the present disclosure provide a defroster, which includes: a housing defining an air outlet; a heating device disposed in the housing; an air blower defining a blowing outlet and disposed in the housing; and an air duct defining a duct inlet at one end thereof and a duct outlet at the other end thereof, the air duct being disposed between the blowing outlet and the heating device so that air blown out from the blower outlet enters the air duct via the duct inlet and goes out of the air duct via the duct outlet, then passes through the heating device to exchange heat with the heating device, and is discharged out of the housing via the air outlet, wherein an area of the duct inlet of the air duct is different from that of the duct outlet of the air duct.

In some embodiments, the air blower has one blowing outlet formed at a center of a surface of the air blower, and the area of the duct outlet is larger than that of the duct inlet.

In some embodiments, the air blower has three or more blowing outlets formed at a periphery of a surface of the air blower, and the area of the duct outlet is smaller than that of the duct inlet.

In some embodiments, the air blower has two blowing outlets formed at left and right sides of a surface of the air blower respectively, and the air duct comprises an upper plate, a right plate, a lower plate and a left plate, each of the right and left plates is connected with the upper and lower plates, and the right plate and the left plate are extended inwardly in a direction from the duct inlet to the duct outlet.

In some embodiments, an inclination angle between the left plate and a vertical plane is about 10 degrees to about 34 degrees, an inclination angle between the right plate and a vertical plane is about 10 degrees to about 34 degrees.

In some embodiments, the two blowing outlets are formed at an upper left corner and an upper right corner of the surface of the air blower respectively, the upper plate and the lower plate are extended downwardly in the direction from the duct inlet to the duct outlet.

In some embodiments, an inclination angle between the upper plate and a horizontal plane is smaller than an inclination angle between the lower plate and a horizontal plane.

In some embodiments, the inclination angle between the upper plate and a horizontal plane is about 0 degree to about 10 degrees, the inclination angle between the lower plate and a horizontal plane is about 40 degrees to about 52 degrees.

In some embodiments, a length of the upper plate in a right and left direction is smaller than that of the lower plate.

In some embodiments, a guiding plate is disposed within the air duct.

In some embodiments, the guiding plate comprises a plurality of left guiding plates and a plurality of right guiding plates, the left guiding plate and the right guiding plate are extended inwardly in a direction from the duct inlet to the duct outlet.

In some embodiments, an inclination angle between the left guiding plate and a vertical plane is about 30 degrees to about 45 degrees, an inclination angle between the right guiding plate and a vertical plane is about 30 degrees to about 45 degrees.

In some embodiments, the guiding plate comprises a plurality of upper guiding plates and a plurality of lower guiding plates, the upper guiding plate and the lower guiding plate are extended downwardly in the direction from the duct inlet to the duct outlet.

In some embodiments, an inclination angle between the upper guiding plate and a horizontal plane is about 10 degrees to about 50 degrees, an inclination angle between the lower guiding plate and a horizontal plane is about 10 degrees to about 50 degrees.

In some embodiments, a first supporting member is disposed within and connected with the housing, the air blower is mounted within the housing via the first supporting member, and the air duct is connected to the first supporting member.

In some embodiments, a second supporting member is disposed within and connected with the housing and the heating device is mounted within the housing via the second supporting member.

In some embodiments, the second supporting member comprises a metal support connected with the housing, and an insulation fixing block connected with two sides of the metal support and configured to mount the heater device on the metal support.

In some embodiments, the heating device is configured as an electric heater and comprises: an outer frame; a heating core disposed in the outer frame and defining a first end and a second end, the first end being adapted to connect to a power source; and a sealing-waterproof glue member disposed in the outer frame and configured to enclose the first end; the heating core comprises: a plurality of heat radiating components; a plurality of heating components, the heating components and the heat radiating components being arranged alternately, and adjacent heating components and heat radiating components being spaced apart from each other and connected with each other via a thermally conductive silicone rubber, the heating component comprising: a core tube connected to a heat radiating component adjacent thereto via the thermally conductive silicone rubber; and a PTC thermistor disposed in the core tube.

In some embodiments, the heating core further comprises a first connecting piece disposed at the first end of the heating core, wherein the heating component further comprises a second connecting piece disposed in the core tube and electrically connected to the PTC thermistor, wherein the second connecting piece has an extending part extended out of the core tube and electrically connected to the first connecting piece, wherein the sealing-waterproof glue member encloses the first connecting piece and the extending part of the second connecting piece.

In some embodiments, both of the first and second ends of the heating core are enclosed by the sealing-waterproof glue member.

In some embodiments, the heating device further comprises a sealing-waterproof glue layer coated on surfaces of the first and second ends of the heating core.

In some embodiments, the core tube comprises an aluminum tube having two load-bearing walls and two heat radiating walls, each of two heat radiating walls is opposed to the heat radiating component adjacent thereto, a thickness of the heat radiating wall is greater than that of the load-bearing wall.

In some embodiments, the thickness of the heat radiating wall is about 1.0 mm to about 1.4 mm, and the thickness of the load-bearing wall is about 0.6 mm to about 1.0 mm.

In some embodiments, the load-bearing wall has a recessed arc portion protruded toward an interior of the core tube.

In some embodiments, the heater device further comprises a low-voltage controlling component disposed between the outer frame and an outermost heat radiating component.

In some embodiments, the low-voltage controlling component comprises a temperature sensor connected to the outermost heat radiating component.

In some embodiments, the housing defines eight air outlets.

Embodiments of a second broad aspect of the present disclosure also provide a vehicle, which comprises a defroster according to the aforementioned embodiments of the present disclosure. Air discharged out of the air outlet of the defroster is blown to a windscreen of the vehicle.

With the air duct, or with the air duct and the guiding plate inside of the air duct, air blown out of the air blower can be blown to the heating device uniformly, and the speed and the temperature of air blown out from the air outlet of the defroster can be uniform, therefore, a performance of defrosting for each region of the windscreen is improved, and a defrosting area is increased. In addition, due to the uniform speed of the air, a heat radiating performance of the heating device, especially the PTC electric heater, can be uniform, and a surface temperature of the heating device can be more uniform, thus, a service life of the heating device is increased.

With at least one end of the heating core being entirely enclosed by the sealing-waterproof glue member, the high-voltage components, such as the first connecting piece, the second connecting piece and electric wires, are completely sealed in the sealing-waterproof glue member, and therefore the waterproofness of the electric heat can be improved. Even when the electric heater is immersed in water, the safety of the electric heater is still guaranteed.

In some embodiments, both ends of the heating core are enclosed by the sealing-waterproof glue member, that is, both ends of the heating core are filled with and coated by the sealing-waterproof glue, and the sealing-waterproof glue member and the heating core form an integral structure. Therefore, the waterproofness of the electric heater can be further enhanced, and a connection performance and shock-proof capability of the heating core can be improved.

Moreover, with the structure of the core tube, the waterproofness of the electric heater and the heat transfer of the PTC (positive temperature coefficient) thermistor are further improved, and the electric heater is easily manufactured. Other performances of the electric heater, such as anti-electrical breakdown, high-voltage resistance and vibration resistance, can be greatly improved.

The defroster having the electric heater is adapted to be used for defrosting or defogging the vehicle, and the defroster may have a good safety and a long service life. Also, the energy consumption of the defroster can be reduced, which increases the driving distance of the vehicle. In addition, the defroster is easy to manufacture and widely used.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
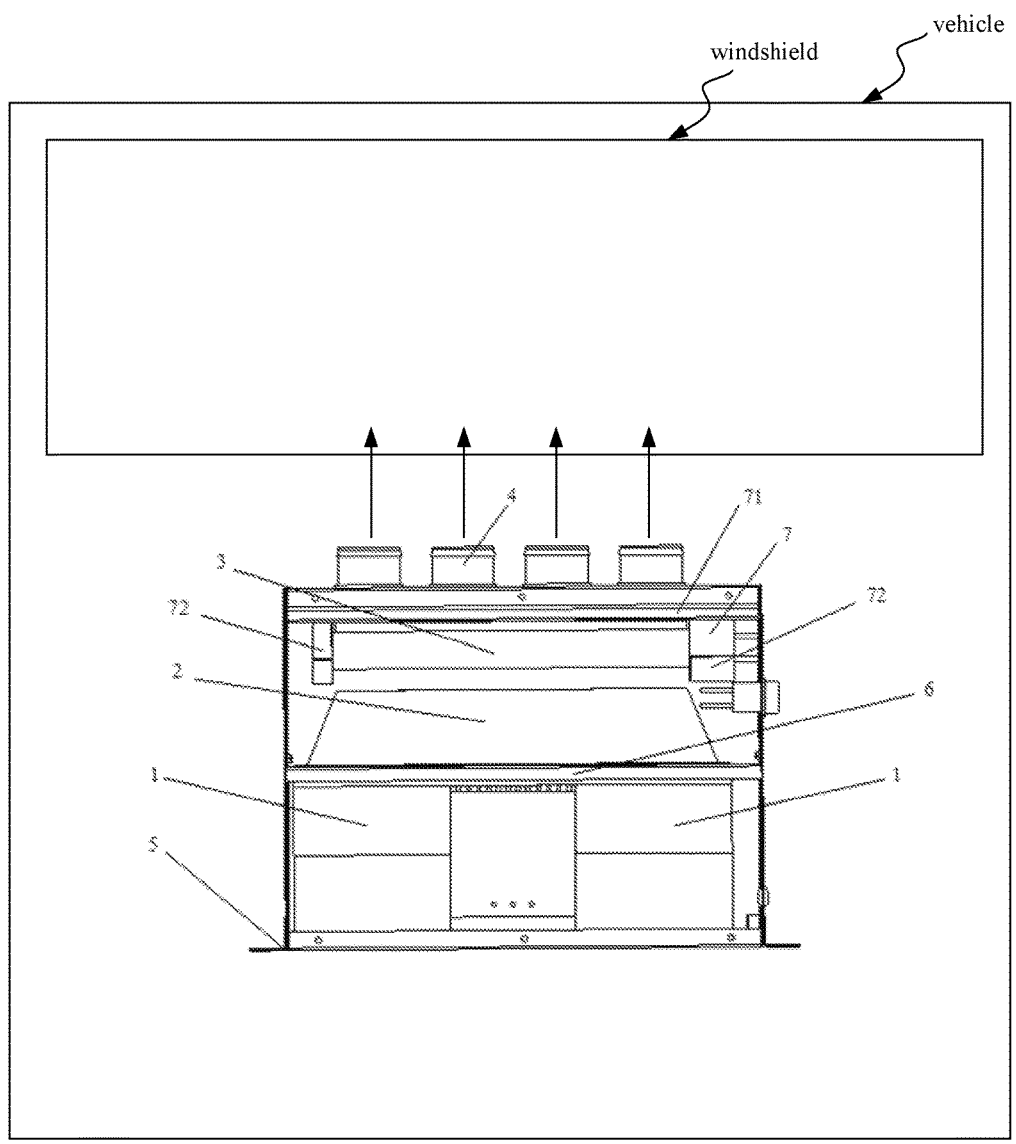
FIG. 1 is a schematic view of a defroster according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "upper", "lower", "right", "left", "horizontal", "vertical" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

The defroster according to embodiments of the present disclosure will be described with reference to FIGS. 1-9.

Figure 3A:
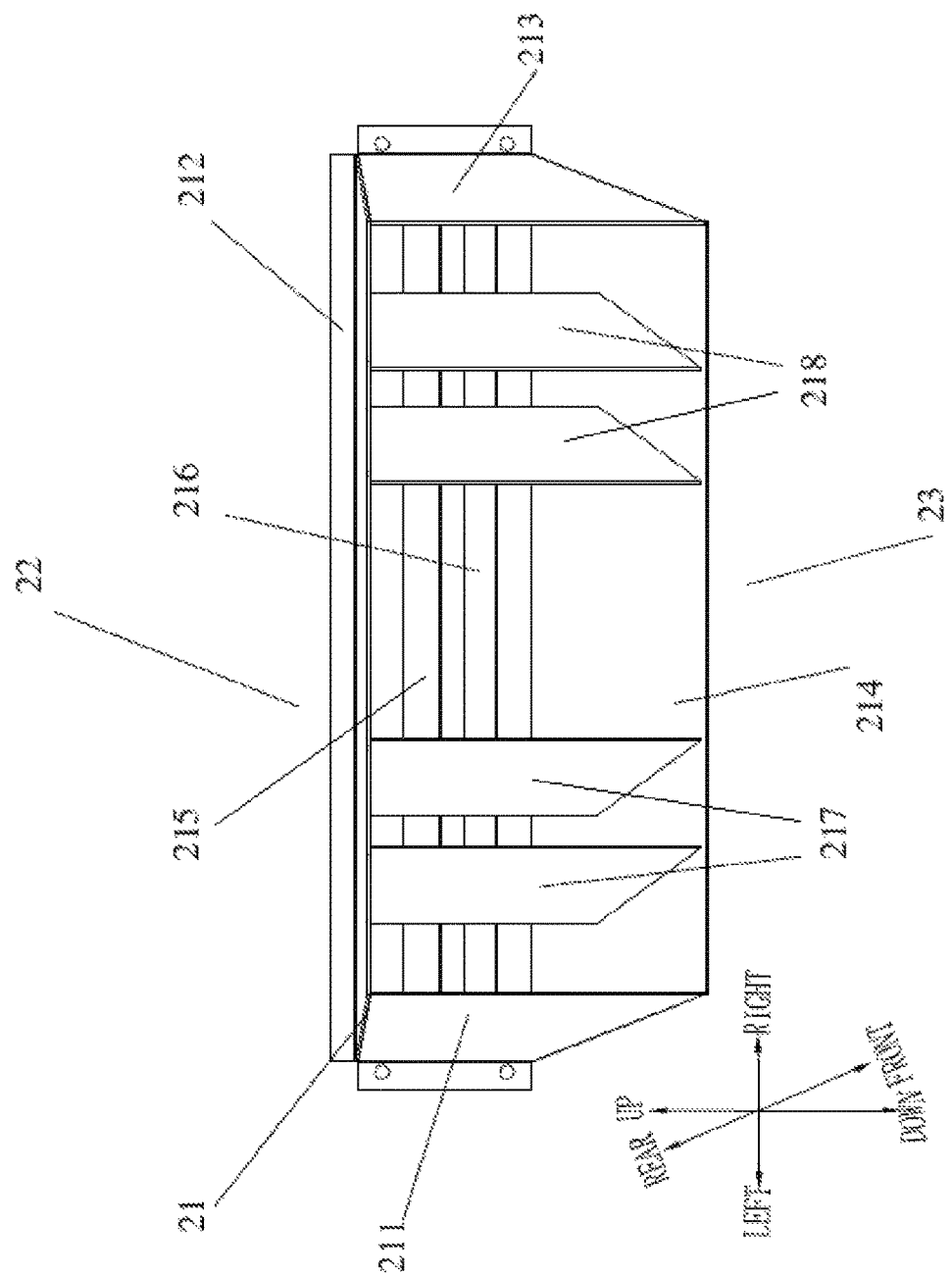
FIGS. 3A-3B are schematic views of an air duct of a defroster according to embodiments of the present disclosure.
Figure 3B:
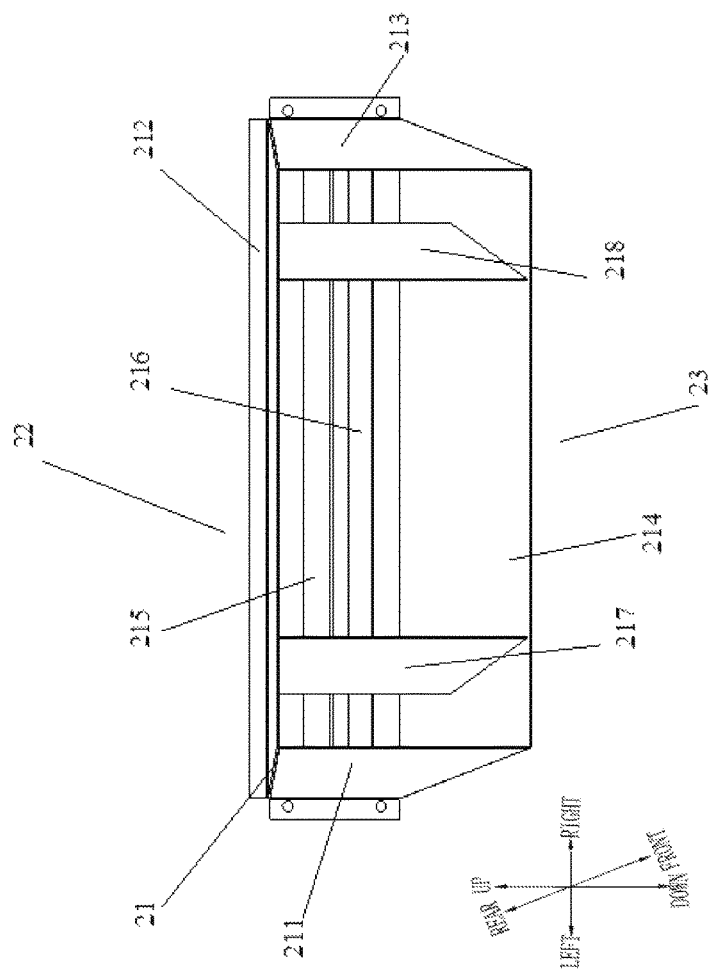
Figure 4:
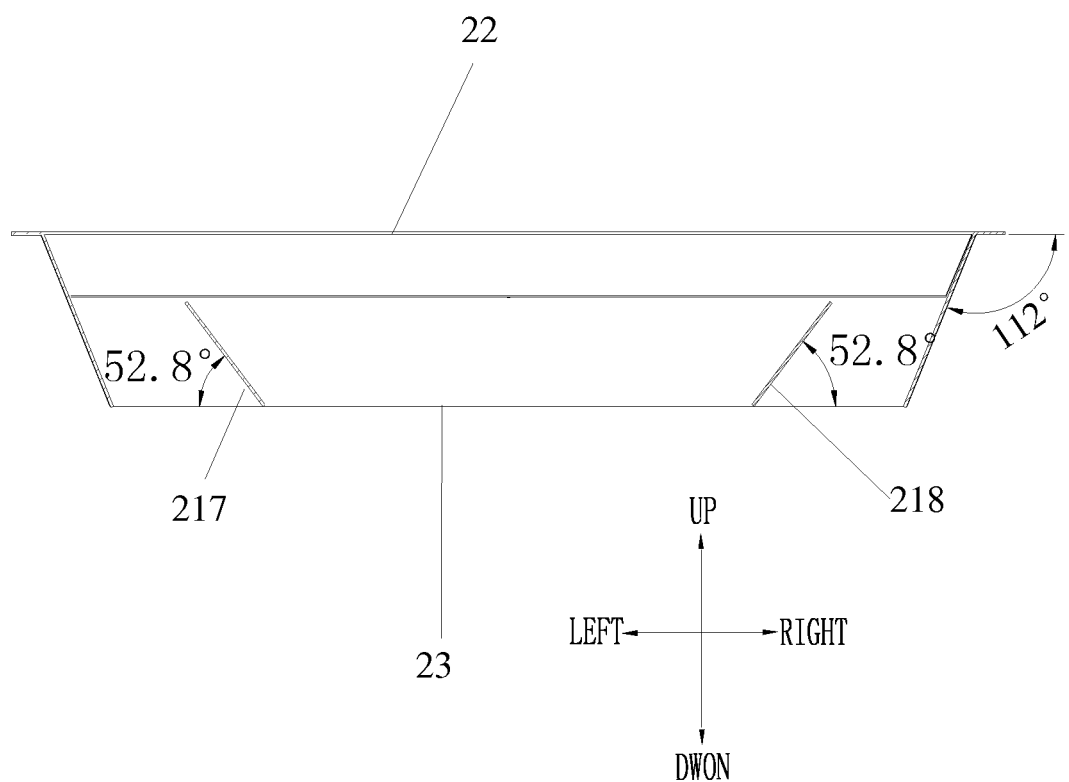
FIG. 4 is a horizontal section view of an air duct of a defroster according to an embodiment of the present disclosure.

As shown in FIG. 1, embodiments of the present disclosure provide a defroster, which includes: a housing 5 having an air outlet 4; a heating device disposed in the housing 5; an air blower 1 disposed in the housing 5; and an air duct 2 disposed in the housing 5. The air duct 2 has a duct inlet 22 and a duct outlet 23, as shown in FIGS. 3A-3B.

It would be appreciated by those skilled in the related art that there are no particular limitations for the housing 5 of the defroster, and the housing 5 can be any commonly used housing in the related art. For example, the housing may be a square housing manufactured from a metal plate.

In some embodiments, the defroster includes a first supporting member 6 disposed within the housing 5 for fixing and supporting the air blower 1 in the housing 5. The supporting member 6 is connected to the housing 5, and the air blower 1 is fixed and supported by the first supporting member 6 in the housing 5. Therefore, the air blower is prevented from moving due to vibration of the vehicle. It would be appreciated by those skilled in the related art there are no particular limitations for the shape and structure of the first supporting member 6, thus, the first supporting member 6 can be any common shape and structure in the related art. On the other hand, the connection between the first supporting member 6 and the housing 5 can use any commonly used connection manner in the related art. The first supporting member 6 may be made of metal.

Figure 2A:
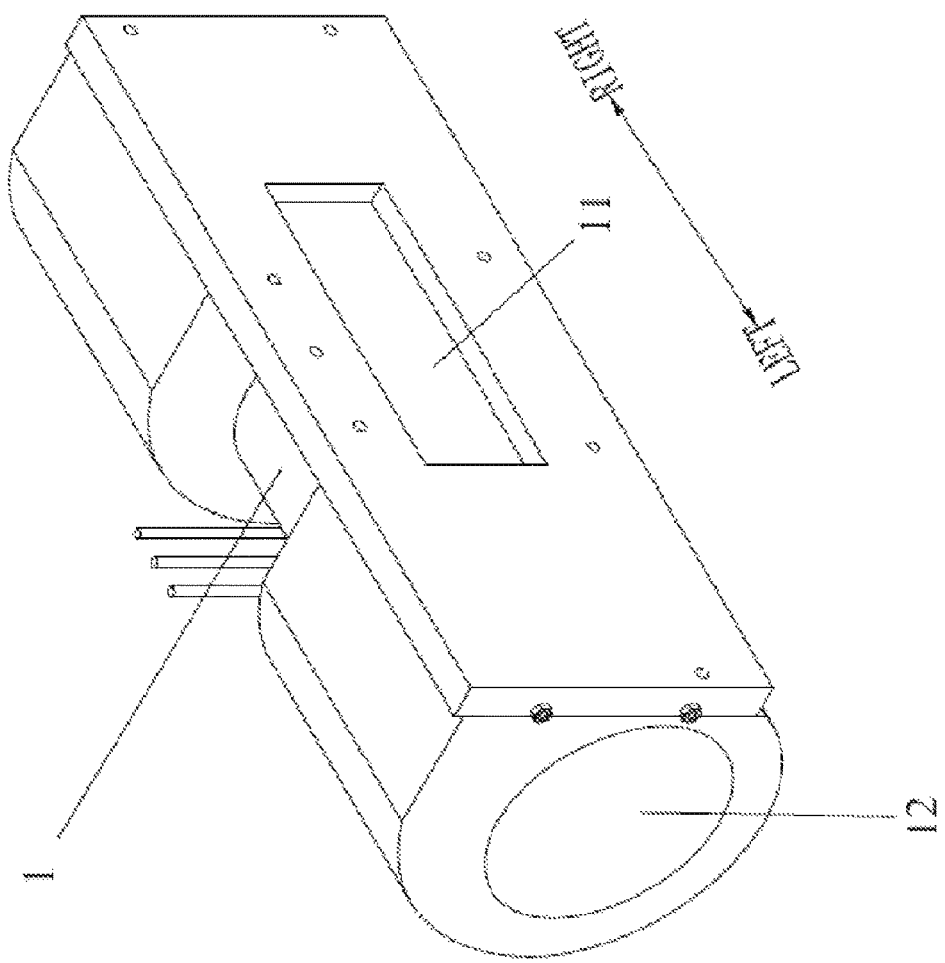
FIGS. 2A-2C are schematic views of a defroster according to embodiments of the present disclosure.

As shown in FIG. 2A, the air blower 1 has a blowing outlet 11 formed at one surface thereof and a blowing inlet 12 formed at another surface thereof. Air is absorbed into from the blowing inlet 12 and blown out from the blowing outlet 11 by the air blower 1. There are no particular limitations for the number and position of the blowing outlet 11, and it can be designed according to actual needs.

For example, in one embodiment, as shown in FIG. 2A, the air blower 1 has one blowing outlet 11, and when the blowing outlet 11 is formed at a center of one surface of the air blower 1, the area of the duct outlet 23 is larger than that of the duct inlet 22. Therefore, the air from the air blower 1 can be dispersed via the air duct 2, so that the air is blown to different regions of the surface of the heating device uniformly, and a speed of the air to the heating device is uniform.

Figure 2B:
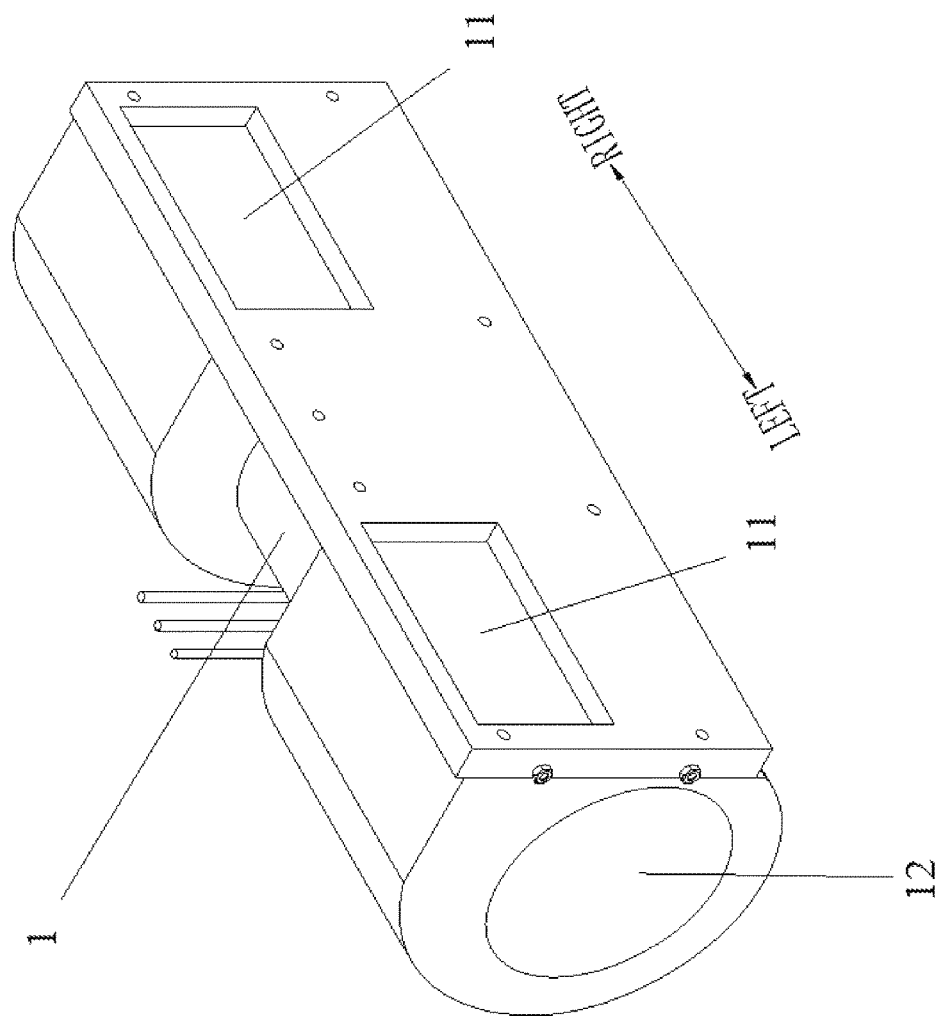
Figure 2C:
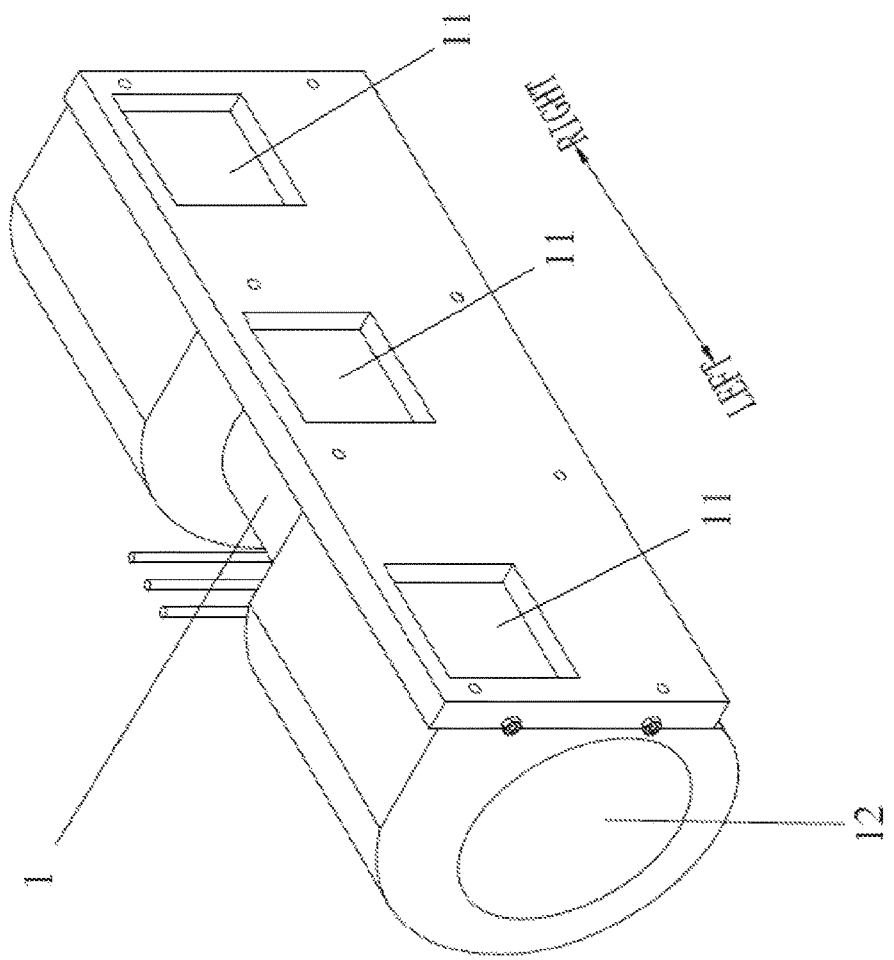

Also, in another embodiment, as shown in FIG. 2B-2C, the air blower 1 has a plurality of blowing outlets 11, and when the blowing outlets 11 are formed at a periphery of one surface of the air blower 1, that is, the blowing outlets 11 are arranged dispersedly, the area of the duct outlet 23 of the air duct is smaller than that of the duct inlet 22 of the air duct. Therefore, the air from the air blower 1 can be concentrated via the air duct 2, so that the air is also blown to different regions of the surfaces of the heater device uniformly, and the speed of the air to the heating device is uniform.

It would be appreciated by those skilled in the related art that according to the position of the blowing outlet 11 and the actual needs, the area of the duct inlet of the air duct and the duct outlet of the air duct can be designed and adjusted, in order to ensure a flowing direction and the speed of the air are uniform.

As shown in FIGS. 3A-3B, the air duct 2 includes a casing 21 having an upper plate 212, a right plate 211, a lower plate 214, and a left plate 213. Each of the right plate 211 and left plate 213 is connected with the upper and lower plates.

With the air duct 2, or with the air duct 2 and a guiding plate in the air duct 2, air blown out from the air blower 1 can be blown to the heating device uniformly, and the speed and the temperature of air blown out from the air outlet 4 is uniform, therefore, defrosting effect for each region of the windscreen of the vehicle can be even, and a defrosting area of the windscreen can be further increased.

In some embodiments, as shown in FIGS. 3A-5B, the air duct 2 is disposed between the blowing outlet 11 and the heater device, the air duct 2 having the duct inlet 22 disposed on one end thereof and the duct outlet 23 disposed on the other end thereof, such that the air blown out from the blower outlet 11 by the air blower passes through the duct inlet 22, the air duct 2, the duct outlet 23 in turn, and arrive at the heater device with which the air exchanges heat. After the heat exchanging, the air is discharged out via the air outlet 4.

The duct inlet 22 of the air duct 2 may be or may not be connected to the air blower 1, and the duct inlet 22 of the air duct 2 may be or may not be aligned to the blower outlet 11.

In the present embodiment, the duct inlet 22 of the air duct 2 is connected to the air blower 1, and the air duct 2 is connected to the first supporting member 6, so as to fix into the housing 5, for example, the air duct 2 may be fixed to the first supporting member 6 via flanges extending from edges of the duct inlet 22 or/and duct outlet 23 and provided with screw holes. The blowing outlet 11 is completely inserted into the duct inlet 22 of the air duct 2, so that the blowing outlet 11 is aligned to the duct inlet 22, and the air out of the air blower 1 can be blown into the air duct 2. The air duct 2 may be fixed into the housing 5 via an individual supporting member or without the supporting member.

In some embodiments of the present disclosure, the area of the duct inlet 22 of the air duct 2 is different from that of the duct outlet 23 of the air duct 22, so that the concentrated or dispersed air from the air blower may be blown to the heater device uniformly.

As shown in FIGS. 3A-3B, each of the left plate 211 and a right plate 213 is connected with the upper plate 212 and lower plate 214. There are no particular limitations for the connections between the left plate 211 and each of the upper plate 212 and the lower plate 214, and between the right plate 213 and each of the upper plate 212 and the lower plate 214. For example, the upper plate 212, the lower plate 214, the right plate 213 and the left plate 211 may be integrally formed, or the connections between the left plate 211 and each of the upper plate 212 and the lower plate 214, and between the right plate 213 and each of the upper plate 212 and the lower plate 214 may also adopt commonly used connection manners in the related art. Also, there are no particular limitations for the size of the upper plate 212, the lower plate 214, the right plate 213 and the left plate 211. Preferably, the upper plate 212 is relatively smaller than the others.

In some embodiments, the air blower 1 has two blowing outlets 11 formed at two sides (for example, the left and right side) of the surface of the air blower 1 respectively. The right plate 213 and the left plate 211 are extended inwardly in a direction from the duct inlet 22 to the duct outlet 23 (i.e. a front-rear direction). Therefore, the air from the air blower 1 can be concentrated and then uniformly blown to the heater device, especially, the air can be blown to the central region of the heater device uniformly.

An inclination angle between the left plate 211 and a vertical plane is about 10 degrees to about 34 degrees, and an inclination angle between the right plate 213 and a vertical plane is about 10 degrees to about 34 degrees. Preferably, the inclination angle between the left plate 211 and the vertical plane is 22 degrees, and the inclination angle between the right plate 213 and the vertical plane is also 22 degrees.

In some embodiments, the air blower 1 has two blowing outlets 11 formed at an upper left corner and an upper right corner of a surface of the air blower 1 respectively, as shown in FIG. 2B. The area of the duct outlet 23 is less than that of the duct inlet 22. Moreover, the upper plate 212 and the lower plate 214 are extended downwardly in the direction from the duct inlet 22 to the duct outlet 23. Therefore, the air can be blown to the heating device uniformly, especially, the air can reach the lower part of the heater device.

An inclination angle between the upper plate 212 and a horizontal plane is less than an inclination angle between the lower plate 214 and a horizontal plane. Therefore, all parts of the heater device may be blown by the air uniformly. The inclination angle between the upper plate 212 and the horizontal plane is about 0 degrees to about 10 degrees, and the inclination angle between the lower plate 214 and the horizontal plane is about 40 degrees to about 52 degrees. Preferably, the inclination angle between the upper plate 212 and the horizontal plane is 4 degrees, and the inclination angle between the lower plate 214 and the horizontal plane is 46 degrees.

In some embodiments, as shown in FIGS. 3A, 3B, 5A, 5B, the air duct further includes a guiding plate disposed within the casing 21 to guide a flowing direction of the air. The guiding plate may be movably disposed to adjust position relative to the casing 21 or fixedly mounted to the casing 21. Moreover, there are no particular limitations for the shape and material of the guiding plate.

In some embodiments, as shown in FIG. 3A, the guiding plate includes a plurality of left guiding plates 217 and a plurality of right guiding plates 218, and the left guiding plate 217 and the right guiding plate 218 are extended inwardly within the air duct 2 in the direction from the duct inlet 22 to the duct outlet 23. Therefore, an interior of the air duct 2 may be divided into several spaces in a left-right direction. There are no particular limitations for the number of the left guiding plates 217 and the right guiding plates 218. For example, as shown in FIG. 3B, the guiding plate may include one left guiding plate 217 and one right guiding plate 218; and thus, the interior space of the air duct 2 is divided into three parts. Also, there are no particular limitations for the size of the left guiding plate 217 and the right guiding plate 218. For example, the size of the left guiding plate 217 and the right guiding plate 218 may be smaller than that of the left plate 211 and the right plate 213.

Upper and lower ends of the left guiding plate 217 and the right guiding plate 218 are connected to the upper plate 211 and the lower plate 214 respectively, front ends of the left guiding plate 217 and the right guiding plate 218 are adjacent to the duct outlet 23 of the air duct 2.

In one embodiment, the air blower 1 has two blowing outlets 11 formed at the upper left corner and the upper right corner of the surface of the air blower 1 respectively. The left guiding plate 217 and the right guiding plate 218 are extended inwardly, so that the air from the blower outlets 11 formed at the upper left corner and the upper right corner of the air blower 1 can be concentrated and then blown to the heating device uniformly, and especially, the air can be blown to the central region of the heating device uniformly.

It would be appreciated by those skilled in the related art that the left guiding plate 217 and the right guiding plate 218 may be extended in different direction according to the positions of the blowing outlets 11 and actual needs.

In some embodiments, an inclination angle between the left guiding plate 217 and a vertical plane is about 30 degrees to about 45 degrees, and an inclination angle between the right guiding plate 218 and a vertical plane is about 30 degrees to about 45 degrees. Preferably, the inclination angle between the left guiding plate 217 and the vertical plane is 37.2 degrees, and the inclination angle between the right guiding plate 218 and the vertical plane is 37.2 degrees.

Figure 5A:
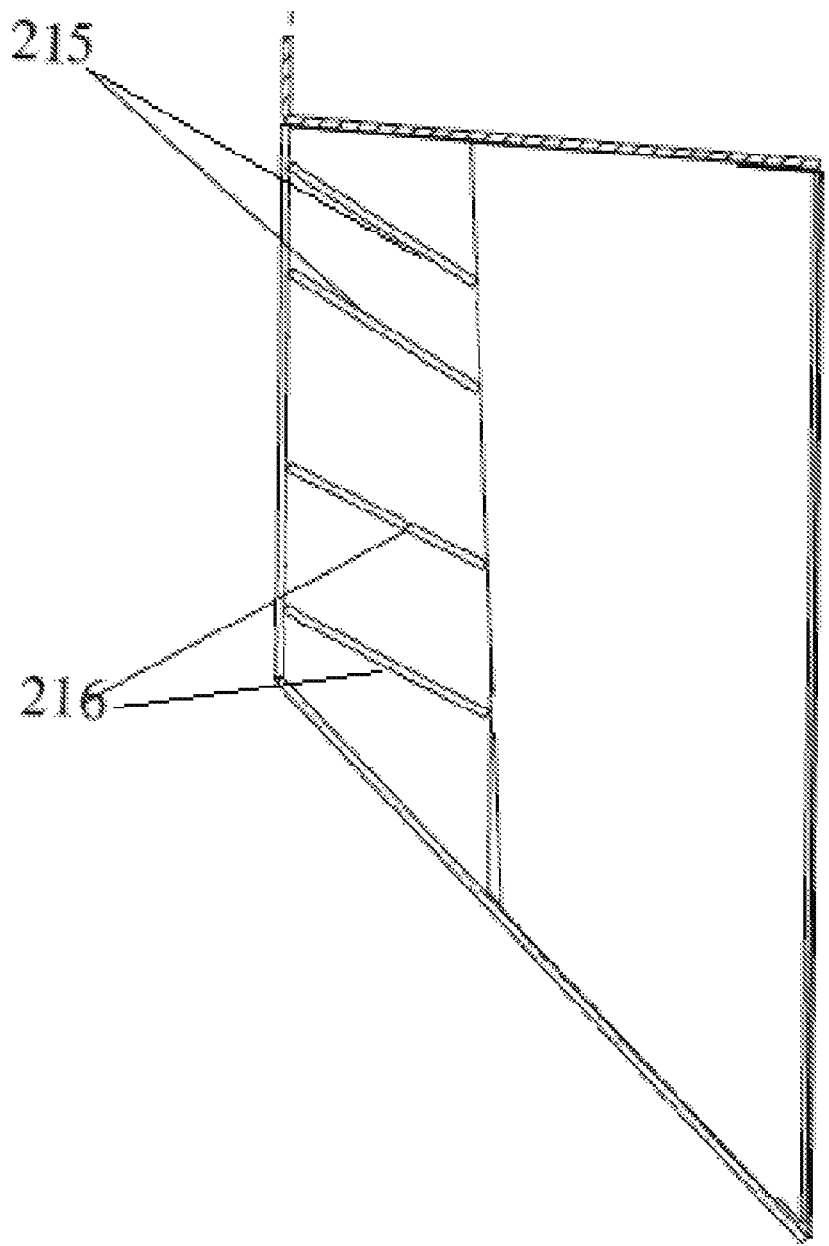
FIGS. 5A-5B are vertical section views of an air duct of a defroster according to embodiments of the present disclosure.
Figure 5B:
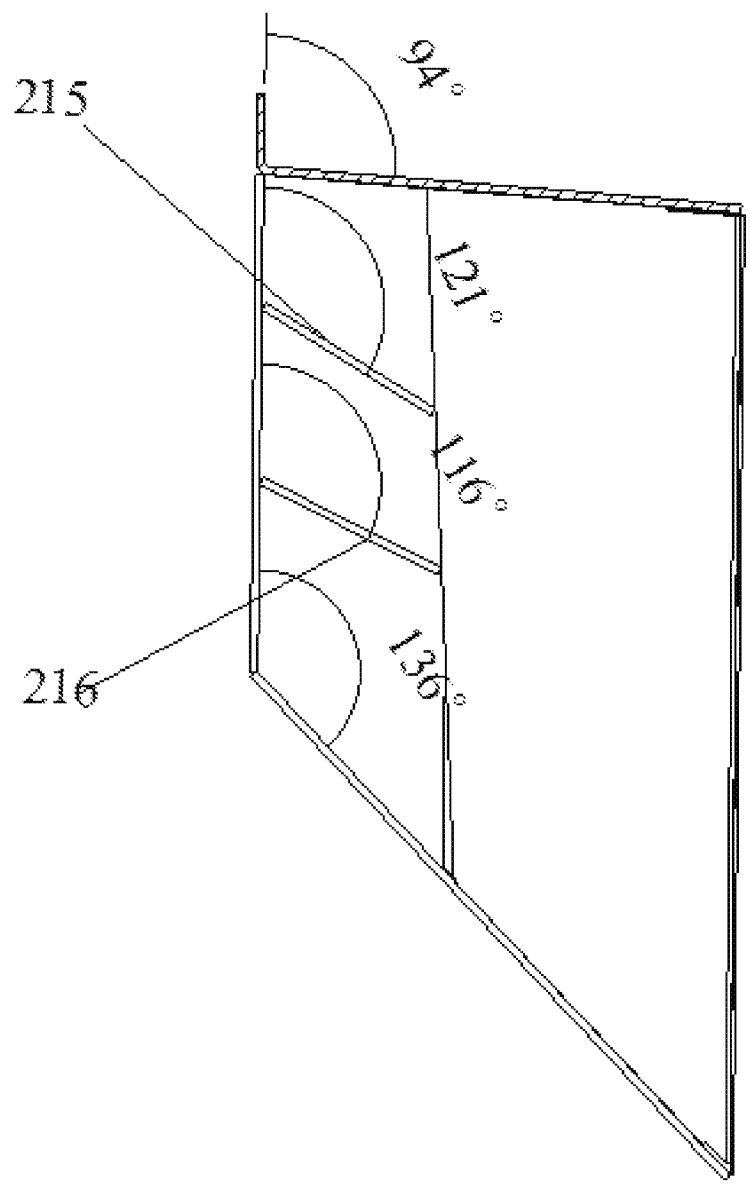

In some embodiments, as shown in FIG. 5A, the guiding plate may further includes a plurality of upper guiding plates 215 and a plurality of lower guiding plates 216, so that the interior of the air duct 2 may be divided into several spaces in an up-down direction. There are no particular limitations for the number of the upper guiding plates 215 and the lower guiding plates 216. For example, as shown in FIG. 5B, the guiding plate may include one upper guiding plate 215 and one lower guiding plate 216, and then the air duct 2 is divided into three spaces.

Also, there are no particular limitations for the size of the upper guiding plate 215 and the lower guiding plate 216, for example, the size of the upper guiding plate 215 and the lower guiding plate 216 may be small. In some embodiments, the upper guiding plate 215 and the lower guiding plate 216 may have a length of about 20 mm to about 30 mm. Therefore, the air in the air duct 2 may be blown to the lower region of the heating device uniformly. Preferably, the upper guiding plate 215 has a length of 25 mm and the lower guiding plate 216 has a length of 25 mm.

A left end and a right end of the upper guiding plate 215 are connected to the left plate 211 and the right plate 213 respectively, and a left end and a right end of the lower guiding plate 216 are connected to the left plate 211 and the right plate 213 respectively. Rear ends of upper guiding plate 215 and the lower guiding plate 216 are adjacent to the duct inlet 22 of the air duct 2, and front ends of the upper guiding plate 215 and the lower guiding plate 216 are connected to the left guiding plate 217 and the right guiding plate 218, namely, rear ends of the left guiding plate 217 and the right guiding plate 218 are connected to the front ends of the upper guiding plate 215 and the lower guiding plate 216.

In one embodiment, the air blower 1 has two blowing outlets 11 formed at the upper left corner and the upper right corner of the surface of the air blower 1 respectively. The upper guiding plate 215 and the lower guiding plate 216 are extended downwardly in the direction from the duct inlet 22 to the duct outlet 23. Therefore, the air from the blower outlets 11 may be blown to the lower region of the heating device uniformly. The inclination angle between the upper guiding plate 215 and the horizontal plane is about 10 degrees to about 50 degrees, and the inclination angle between the lower guiding plate 216 and the horizontal plane is about 10 degrees to about 50 degrees. Preferably, the inclination angle between the upper guiding plate 215 and a horizontal plane is greater than the inclination angle between the lower guiding plate 216 and a horizontal plane. Thus, the inclination angle between the upper guiding plate 215 and the horizontal plane is 31 degrees, and the inclination angle between the lower guiding plate 216 and the horizontal plane is 26 degrees.

It would be appreciated by those skilled in the related art that the upper guiding plate 215 and the lower guiding plate 216 may be extended in different direction according to the positions of the blowing outlets 11 and actual needs.

There are no particular limitations for the heating device. The heating device may be any commonly used heating device in the related art. Preferably, the heating device is a PTC (Positive Temperature Coefficient) electric heater 3.

Figure 6:
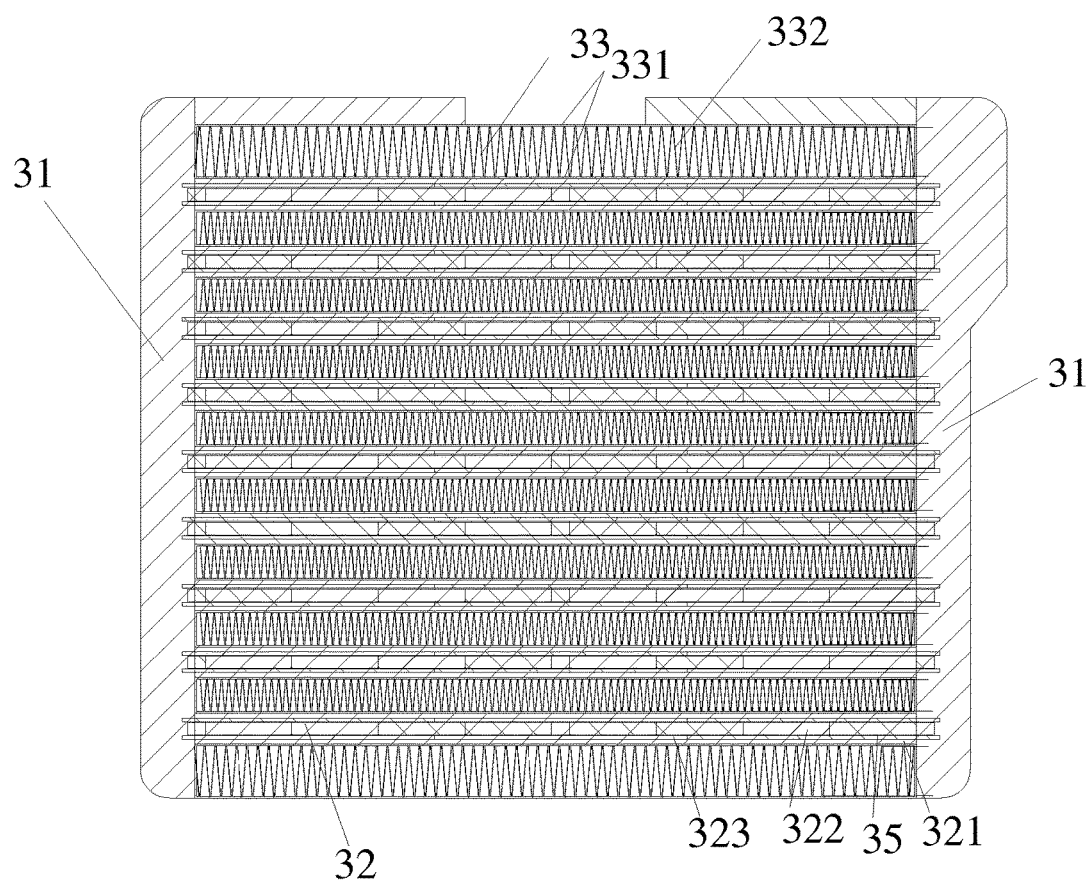
FIG. 6 is a sectional view of a heating core of a heating device of a defroster according to an embodiment of the present disclosure.
Figure 7:
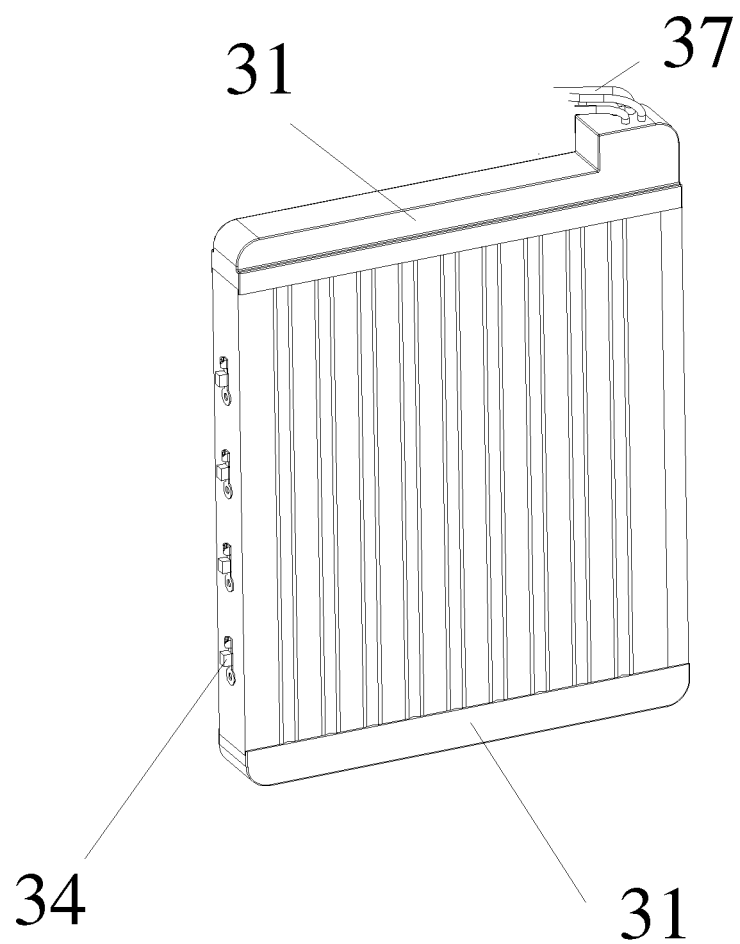
FIG. 7 is a schematic view of a heating core without a frame of a heating device of a defroster according to an embodiment of the present disclosure.
Figure 9:
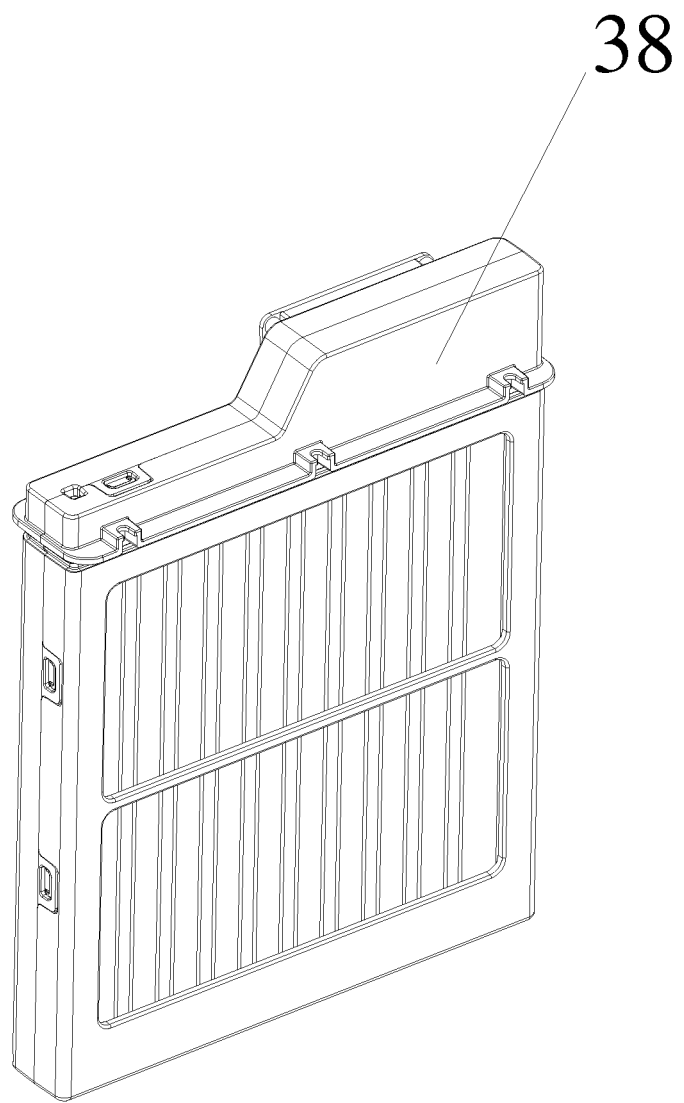
FIG. 9 is a schematic view of an assembled heating device of a defroster according to an embodiment of the present disclosure.

In some embodiments, as shown in FIG. 6, FIG. 7 and FIG. 9, the PTC electric heater includes an outer frame 38 and a heating core disposed in the outer frame 38.

The electric heater 3 may include at least one heating core, and there are no particular limitations for the connection and position relationships for these heating cores. As shown in FIG. 6, the heating core includes a plurality of heat radiating components 33 and a plurality of heating components 32. The heat radiating components 33 and the heating components 32 are spaced apart from each other.

As shown in FIG. 6, the outer frame 38 includes four side frames, and each two of the four side frames may be connected with each other via any commonly used fixing manner. In addition, the outer frame 38 may be configured as a square box. There are no particular limitations for the structure and material of the outer frame 38, and thus, descriptions of the structure and the material of the outer frame are omitted here.

In some embodiments, the heating core has a first end and a second end. At least one of the first and second ends is configured to connect to a power source (not shown). For example, the first end of the heating core may be connected to external power supplies.

The heating core further includes a first connecting piece 36 disposed at the first end of the heating core and connected with an electric wire 37. The electric wire 37 is configured to connect with an external current.

The heating components 32 includes a core tube 321 and a PTC thermistor 322 disposed in the core tube 321. The core tube 321 includes a second connecting piece 35 extending out from the first end of the heating core and electrically connected to the first connecting piece 36. Then the second connecting piece 35 is electrically connected to the external power supplies via the electric wire 37.

The electric wire 37 may extend out of the frame 8 from one or more sides. It should be noted that there are no particular limitations for extending path of the electric wire 37, it depends on actual needs. For example, if the first connecting pieces are disposed on both two ends of the heating core, the electric wire 37 may extend out of the outer frame 38 from the two ends of the heating core.

In some embodiments, the heating device further includes a sealing-waterproof glue member 31. The sealing-waterproof glue member 31 is disposed in the outer frame 38 and configured to enclose at least one end of the heating core. Preferably, both ends of the heating core are enclosed by the sealing-waterproof glue member 31 respectively. That is, ends of the core tube 321 and the heat radiating components 33, and space between the core tube 321 and the heat radiating components 33 are filled with sealing-waterproof glue.

In some embodiments, at least one end of the heating core includes a first connecting piece 36 configured to connect a current source. The heating components 32 further include a second connecting piece 35 disposed in the core tube 321 and electrically connected to the PTC thermistor 322. The second connecting piece 35 has an extending part extended out of the core tube 321 and electrically connected to the first connecting piece 36. The first connecting piece 36 and the extending part of the second connecting piece 35 are enclosed within the sealing-waterproof glue member 31. It would be appreciated by those skilled in the related art that "electrically connected" may be any commonly used electrical connection manners, for example, a conductive material may disposed between the first connecting piece 36 and the second connecting piece 35.

In some embodiments, the heating core may be electrically connected to an external power source at one end of the heating core, and the heating core may also be electrically connected to an external power source at two ends of the heating core. Also, there are no particular limitations for number of the first connecting piece 36.

In some embodiments, both of the first and second ends of the heating core are enclosed by the sealing-waterproof glue member 31. Thus, the core tube 321 can be completely sealed, and high-voltage components can be entirely sealed within the core tube 321. Therefore, the waterproofness of the electric heater is improved, and even when the electric heater is dipped in water, a safety of the electric heater can be ensured. The electric heater, adapted to be used for defrosting or heating in a vehicle, is safe and has a long service life and lower energy consumption, thus increasing the driving distance of the vehicle.

In some embodiments, a sealing-waterproof glue layer is coated on surfaces of the first and second ends of the heating core. The sealing-waterproof glue layer may be an extending part of the sealing-waterproof glue member 31. Or, the sealing-waterproof glue layer and the sealing-waterproof glue member 31 may be coated individually and then form an integral structure. Thus, the first and second ends of the heating core can be covered by sealing-waterproof glue, such that the waterproofness of the electric heater, and connection performance and shock resistant performance of the heating core can be further improved. Preferably, a tail part of the electric wire 37 is coated with the sealing-waterproof glue, thus, the waterproofness of the electric heater can be further improved.

In some embodiments, there are no particular limitations for shape of the sealing-waterproof glue member 31, the sealing-waterproof glue member 31 may have different shapes according to actual needs. Also, there are no particular limitations for method of manufacturing the sealing-waterproof glue member 31. For example, the sealing-waterproof glue member 31 may be manufactured by a mold, that is, a mold matched with the size of the heating core is be pre-produced, next the heating core is placed in the mold, then a sealing-waterproof glue is filled into the mold and cured, so that the ends of the heating core can be closely enclosed by the sealing-waterproof glue.

In one embodiment, the sealing-waterproof glue member 31 is made of a silicone rubber. The silicone rubber may be processed by special treatment, such as special heat treatment. Thus, a heat-resistance temperature of the silicone rubber is no less than 280° C., a heat conductivity coefficient of the silicone rubber is no less than 1.4 W/(m·K) and a cohesiveness of the silicone rubber is greater than 4 MPa.

In some embodiments, the core tube 321 may be an aluminum tube, and the PTC thermistor 322 is disposed in the core tube 321. When the PTC thermistor 322 is power on, the PTC thermistor 322 is heated. The heat generated by the PTC thermistor 322 may be firstly transferred to the core tube 321, then transferred to the heat radiating component 33, and then is taken away by the air. In embodiments of the present disclosure, two open ends of the aluminum tube are covered and enclosed by the sealing-waterproof glue, therefore a waterproofness of the electric heater can be further improved.

Figure 8:
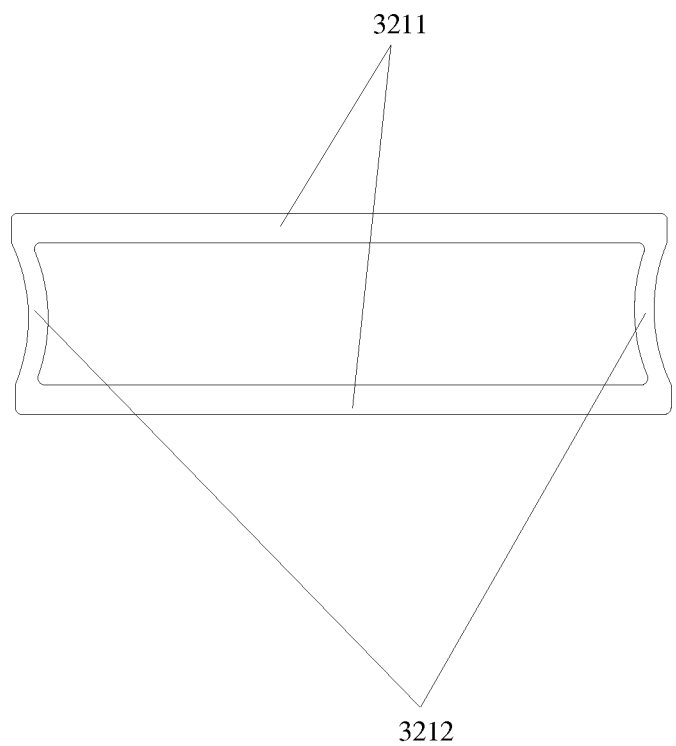
FIG. 8 is a sectional view of a core tube of an heating device of a defroster according to an embodiment of the present disclosure.

As shown in FIG. 8, the core tube 321 comprises two heat radiating walls 3211 o and two load-bearing walls 3212 connected to the two heat radiating walls 3211 respectively. Each of the heat radiating walls 3211 is opposed to the heat radiating component 33 adjacent thereto. In one embodiment, a thickness of the heat radiating wall 3211 is different from that of the load-bearing wall 3212. For example, the thickness of the heat radiating wall 3211 is greater than that of the load-bearing wall 3212, therefore, the heat radiating wall 3211 may be contacted with an insulating member, such as a ceramic member, more tightly, which is good for heat transferring for the PTC thermistor 322. In embodiments of the present disclosure, the thickness of the heat radiating wall 3211 is about 1.0 mm to about 1.4 mm, and the thickness of the load-bearing wall 3212 is about 0.6 mm to about 1.0 mm. More particularly, the heat radiating wall 3211 has a thickness of 1.35 mm, and the load-bearing wall 3212 has a thickness of 0.9 mm.

As shown in FIG. 8, in one embodiment, the load-bearing wall 3212 has a recessed arc portion protruded toward an interior of the core tube 321. Therefore, the sealing-waterproof glue may be filled more easily, and during filling the sealing-waterproof glue, the core tube 321 may be not inclined, and the structure is more stable. Therefore, a waterproofness of the electric heater may be further improved.

In embodiments of the present disclosure, there are no limitations for height of the core tube 321, and it may be designed according to actual needs. For example, the height of the core tube 321 may be designed according to the size and structure of the PTC thermistor 322. In one embodiment, the core tube 321 has an outer height of 9.2 mm and an inner height of 6.5 mm.

The core tube 321 may be made of a metal material. According to the material of the core tube 321, the heating component 32 further includes an insulating member disposed between the core tube 321 and the PTC thermistor 322. In one embodiment, the insulating member includes a ceramic plate, for example, an aluminum oxide ceramic plate 323. Since the ceramic plate has an excellent insulating property, a high heat conductivity coefficient and a good high-temperature resistant performance, therefore, performances, such as insulating property, of the electric heater may be further improved.

In some embodiments, a thermally conductive silicone rubber is disposed between the core tube 321 and the heat radiating component 33 adjacent to the core tube 321. Then the core tube 321 and the heat radiating component 33 are bonded to form the heating core. There are no particular limitations for the surface of the core tube 321, for example, a surface of the core tube 321 connected with the heat radiating component 33 (i.e., a surface of the heat radiating wall 3211) may be processed via abrasive blasting to form an abrasive blasted surface. Before abrasive blasting, the surface of the core tube 321 may be subjected to a coarsening treatment. After being processed by coarsening treatment and abrasive blasting, the thermally conductive silicone rubber is disposed between the core tube 321 and the adjacent heat radiating component 33. Therefore, a bonding strength between the core tube 321 and the heat radiating component 33 may be improved, which is good for the thermal conductivity.

In embodiments of the present disclosure, there are no particular limitations for the PTC thermistor 322, the PTC thermistor 322 may be any commonly well-known the PTC thermistor. Preferably, in the present disclosure, the PTC thermistor 322 has a high heating rate, a high power and low power consumption. Generally speaking, the PTC thermistor 322 includes a conductive substrate, a positive temperature coefficient material and a conductive electrode. The positive temperature coefficient material is disposed between two conductive substrates and coated on the conductive substrates, the conductive electrodes are disposed on the conductive substrate and connected to electrode terminals, and the electrode terminals form a wiring harness to connect with a power source.

In some embodiments, the PTC thermistor 322 is disposed in the core tube 321 to form the heating component, an aluminum oxide ceramic plate 323 is clamped between the core tube 321 and the PTC thermistor 322. The aluminum oxide ceramic plate 323 has a good insulating property and an excellent thermal conductivity, such that the PTC thermistor 322 is insulated from the core tube 321 and heat generated by the PTC thermistor 322 may be transmitted to the heat radiating component 33 through the core tube 321 effectively.

The PTC thermistor 322 may have a high heating rate and a high power, in some embodiments, two heat radiating components 33 are disposed between adjacent heating components, and two heat radiating components 33 are disposed between the outer frame and an outermost heating component, thus enlarging a heat radiating area.

It should be noted that, in some embodiments, one or more than three heat radiating components 33 are disposed between two adjacent heating components, and one or more than three heat radiating components 33 are disposed between the outer frame 38 and an outermost heating component of the heating components 32. The number of the heat radiating component 33 can be designed according to power of the PTC thermistor 322 and heat radiating efficiency of the heat radiating component 33. In some embodiments, one or two heat radiating components 33 are disposed between two adjacent heating components 32, and two heat radiating component 33 is disposed between the outer frame 38 and an outermost heating component of the heating components 32. Therefore, heat may be transferred to the heat radiating component 33 quickly, and then be dissipated by the heat radiating component 33 efficiently.

In some embodiments, the heat radiating component 33 includes two connecting sheets 331 and a heat radiating sheet 332 disposed between the two connecting sheets 321, the heat radiating sheet 332 has a corrugated shape. Both the connecting sheet 331 and the heat radiating sheet 332 may be made of an aluminum sheet. For example, a connecting sheet 331 is manufactured from an aluminum sheet having a thickness of 0.8 mm, and a heat radiating sheet 332 is manufactured by bending an aluminum sheet having a thickness of 0.2 mm to form a corrugated aluminum sheet, and then the heat radiating sheet 332 is fixed between two connecting sheets 331 by soldering to form the heat radiating component 33. Then the heat radiating component 33 may have a large heat radiating area and a better heat radiating efficiency. In embodiments of the present disclosure, the connecting sheet 331 may have an abrasive blasted surface form thereon, such that a bonding strength and a thermal conductivity between the core tube 321 and the heat radiating component 33 may be improved.

In some embodiments, the electric heater further includes a low-voltage controlling component. The low-voltage controlling component may detect a parameter variation of the heating core, and then feedback the parameter variation to a control system to cut off the current or circuit to ensure safety of the vehicle. In one embodiment, the low-voltage controlling component is disposed between the outer frame and an outermost heat radiating component 33. In one embodiment, as shown in FIG. 8, the low-voltage controlling component includes a temperature sensor 34. The temperature sensor 34 may be riveted on the outermost heat radiating component 33. The temperature sensor 34 may detect a temperature of the heat radiating component 33, and when the temperature of the heat radiating component 33 is higher than a predetermined value, the temperature sensor 34 may feedback the temperature to the control system to cut off the current or circuit to ensure the safety of the vehicle.

In embodiments of the present disclosure, the heating device may be or may not be connected with the duct outlet 23. In some embodiments, the heating device includes a PTC heating device with a small volume, so that the heating device may not be connected with the duct outlet 23.

In some embodiments, the defroster further includes a second supporting member 7 for fixing and supporting the heating device in the housing 5. The second supporting member 7 is connected to the housing 5. There are no particular limitations for the connection type between the housing 5 and the second supporting member 7, may be any commonly well-known connection type in the related art, and therefore, the detailed descriptions of the connection type between the housing 5 and the second supporting member 7 are omitted here.

In one embodiment, the second supporting member 7 includes a metal support 71 connected to the housing 5 and an insulation fixed block 72 disposed on two sides of the metal support 71 and connected to the metal support 71, the PTC electric heater is mounted on the metal support. Then an electric leakage may be avoided.

In some embodiments, the air outlet 4 is disposed on a surface of the housing 5, a cold air blown out of the air blower may be heated by the heating device, and then the air is blown out through the air outlet 4 to defrost. There are no particular limitations for the number of the air outlet 4. In one embodiment, the defroster includes eight air outlets. Thus, a defrosting effect may be more equal.

According to embodiments of the present disclosure, a vehicle is provided. The vehicle includes the defroster according to aforementioned embodiments of the present disclosure. The air outlet 4 of the defroster faces a windscreen of the vehicle. Then a cold air blown out of the air blower may be heated by the heating device to form a warm air; then the warm air may be blown to the windscreen of the vehicle for defrosting the windscreen.

It should be noted that the air outlet 4 may be connected to the windscreen via a common connection type that known by one of ordinary skills in the art. For example, in one embodiment, a ventilation device is connected to the air outlet 4, the ventilation device has a flexible ventilation pipe matched with the air outlet 4 in number, and the flexible ventilation pipe is connected to an air vent facing to the windscreen. The air vent is disposed on an instrument panel of the vehicle. Then the air with heat may be blown to the windscreen via the flexible ventilation pipe and the air vent to defrost and defog.

The flexible ventilation pipe may be a rubber pipe or a plastic pipe which has certain flexibility. The air vent includes a body part, a guiding opening part having a flat shape and disposed on one end of the body part and a connection part having a cylinder shape, connected to the flexible ventilation pipe and disposed on other end of the body part. The air guiding opening part is communicated with the connection part. The connection part may be fitted over on the flexible ventilation pipe. Similarly, the flexible ventilation pipe may be fitted over on the connection part. The flat guiding opening part may reduce an area of air blown out therefrom, then to increase a speed of the air blown out therefrom. In one other embodiment, the air vent further includes a mounting plate horizontally extending from center of the body part. The mounting plate is fixed to a surface of the instrument panel. The mounting plate may be fixed by a screw. The air vent may be formed by integral molding a plastic component having a thickness of about 1.5 mm to about 3 mm. When installing the air vent, the connection part of the air vent may be pass through an air hole and the instrument panel, and then fixed on the instrument panel.

With the defroster according to the present disclosure, the defrosting effect of the vehicle may be improved, and the defrosting area may be more proper, and the defroster may have a long service life.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. A defroster for a vehicle, comprising:
a housing including an air outlet that faces upwards and towards an edge of at least one of a windscreen or a window;
a heating device disposed in the housing;
an air blower disposed in the housing below the heating device and including a blowing outlet; and
an air duct disposed in the housing and including a duct inlet at one end thereof and a duct outlet facing the air outlet of the housing at the other end thereof, the air duct being disposed between the blowing outlet and the heating device, the air duct forming a straight path between the blowing outlet of the air blower and the air outlet of the housing to direct air blown out from the blowing outlet to pass through the heating device and out of the housing via the air outlet, and the air duct comprising one or more guiding plates disposed within the air duct, wherein
the air blower has two blowing outlets formed at left and right sides of a surface of the air blower respectively, and the air duct comprises an upper plate, a right plate, a lower plate and a left plate, each of the right and left plates is connected with the upper and lower plates, and the right plate and the left plate are extended inwardly in a direction from the duct inlet to the duct outlet.

2. The defroster of claim 1, wherein the air blower has one blowing outlet formed at a center of a surface of the air blower, and the area of the duct outlet is larger than that of the duct inlet.

3. The defroster of claim 1, wherein the air blower has three or more blowing outlets formed at a periphery of a surface of the air blower, and the area of the duct outlet is smaller than that of the duct inlet.

4. The defroster of claim 1, wherein an inclination angle between the left plate and a vertical plane is about 10 degrees to about 34 degrees, an inclination angle between the right plate and the vertical plane is about 10 degrees to about 34 degrees.

5. The defroster of claim 1, wherein the two blowing outlets are formed at an upper left corner and an upper right corner of the surface of the air blower respectively, the upper plate and the lower plate are extended downwardly in the direction from the duct inlet to the duct outlet.

6. The defroster of claim 5, wherein an inclination angle between the upper plate and a horizontal plane is smaller than an inclination angle between the lower plate and a horizontal plane.

7. The defroster of claim 6, wherein the inclination angle between the upper plate and a horizontal plane is about 0 degree to about 10 degrees, the inclination angle between the lower plate and a horizontal plane is about 40 degrees to about 52 degrees.

8. The defroster of claim 5, wherein a length of the upper plate in a right and left direction is smaller than that of the lower plate.

9. The defroster of claim 1, wherein the one or more guiding plates comprise a plurality of left guiding plates and a plurality of right guiding plates, the left guiding plate and the right guiding plate being extended inwardly in a direction from the duct inlet to the duct outlet.

10. The defroster of claim 9, wherein an inclination angle between the left guiding plate and a vertical plane is about 30 degrees to about 45 degrees, an inclination angle between the right guiding plate and the vertical plane is about 30 degrees to about 45 degrees.

11. The defroster of claim 1, wherein the one or more guiding plates comprise a plurality of upper guiding plates and a plurality of lower guiding plates, the upper guiding plate and the lower guiding plate being extended downwardly in the direction from the duct inlet to the duct outlet.

12. The defroster of claim 11, wherein an inclination angle between the upper guiding plate and a horizontal plane is about 10 degrees to about 50 degrees, an inclination angle between the lower guiding plate and a horizontal plane is about 10 degrees to about 50 degrees.

13. The defroster of claim 1, wherein a first supporting member is disposed within and connected with the housing, the air blower is mounted within the housing via the first supporting member, and the air duct is connected to the first supporting member.

14. The defroster of claim 1, wherein a second supporting member is disposed within and connected with the housing and the heating device is mounted within the housing via the second supporting member.

15. The defroster of claim 14, wherein the second supporting member comprises a metal support connected with the housing, and an insulation fixing block connected with two sides of the metal support and configured to mount the heater device on the metal support.

16. The defroster of claim 1, wherein the heating device is configured as an electric heater and comprises:
an outer frame;
a heating core disposed in the outer frame and defining a first end and a second end, the first end being adapted to connect to a power source; and
a sealing-waterproof glue member disposed in the outer frame and configured to enclose the first end,
the heating core comprising:
a plurality of heat radiating components;
a plurality of heating components, the heating components and the heat radiating components being arranged alternately, and adjacent heating components and heat radiating components being spaced apart from each other and connected with each other via a thermally conductive silicone rubber, and
the heating component comprising:
a core tube connected to a heat radiating component adjacent thereto via the thermally conductive silicone rubber; and
a positive temperature coefficient (PTC) thermistor disposed in the core tube.

17. The defroster of claim 16, wherein the heating core further comprises a first connecting piece disposed at the first end of the heating core,
wherein the heating component further comprises a second connecting piece disposed in the core tube and electrically connected to the PTC thermistor,
wherein the second connecting piece has an extending part extended out of the core tube and electrically connected to the first connecting piece,
wherein the sealing-waterproof glue member encloses the first connecting piece and the extending part of the second connecting piece.

18. A vehicle, comprising:
at least one of a windscreen and a window; and
a defroster comprising:
a housing including an air outlet facing upwards and towards to an edge of the at least one of a windscreen and a window;
a heating device disposed in the housing;
an air blower disposed in the housing below the heating device and including a blowing outlet; and
an air duct disposed in the housing and including a duct inlet at one end thereof and a duct outlet facing the air outlet of the housing at the other end thereof, the air duct being disposed between the blowing outlet and the heating device, the air duct forming a straight path between the blowing outlet of the air blower and the air outlet of the housing to direct air blown out from the blowing outlet to pass through the heating device and out of the housing via the air outlet, and the air duct comprising one or more guiding plates disposed within the air duct, wherein
the air blower has two blowing outlets formed at left and right sides of a surface of the air blower respectively, and the air duct comprises an upper plate, a right plate, a lower plate and a left plate, each of the right and left plates is connected with the upper and lower plates, and the right plate and the left plate are extended inwardly in a direction from the duct inlet to the duct outlet.

19. The defroster of claim 1, wherein the heating device comprises:
one or more heat radiating components;
one or more thermistors; and
one or more core tubes coupled with the one or more heat radiating components and house the one or more thermistors.

* * * * *

UNITED STATES PATENT AND TRADEMARK OFFICE
CERTIFICATE OF CORRECTION

PATENT NO. : 10,059,306 B2
APPLICATION NO. : 14/887830
DATED : August 28, 2018
INVENTOR(S) : Qing Gong et al.

Page 1 of 1

It is certified that error appears in the above-identified patent and that said Letters Patent is hereby corrected as shown below:

On the Title Page

Item (30), in the Foreign Application Priority Data:

"Apr. 28, 2013 (CN)............... 2013 1 0154826" should read
--Apr. 28, 2013 (CN)............. 201310154826.9--

"Apr. 28, 2013 (CN)............... 2013 2 0223604 U" should read
--Apr. 28, 2013 (CN)............. 201320223604.3--

"Apr. 28, 2013 (CN)............... 2013 2 0226881 U" should read
--Apr. 28, 2013 (CN)............. 201320226881.X--

Signed and Sealed this
Twenty-first Day of May, 2019

Andrei Iancu
*Director of the United States Patent and Trademark Office*